Dec. 26, 1961 K. HEHL 3,014,241
INJECTION DEVICE
Filed March 14, 1960 2 Sheets-Sheet 1

Inventor:
Karl Hehl
by George H. Spencer
attorney

Dec. 26, 1961 K. HEHL 3,014,241
INJECTION DEVICE
Filed March 14, 1960 2 Sheets-Sheet 2
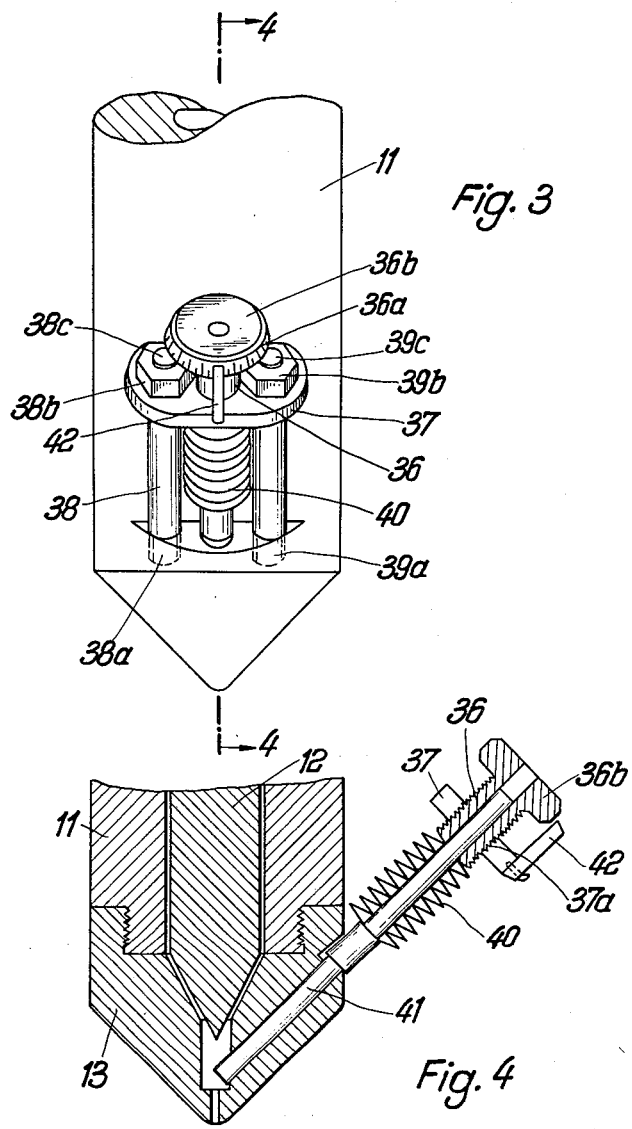

United States Patent Office 3,014,241
Patented Dec. 26, 1961

3,014,241
INJECTION DEVICE
Karl Hehl, Lossburg, Wurttemberg, Germany, assignor to Arburg-Feingeratefabrik oHG. Hehl & Sohne, Lossburg, Wurttemberg, Germany
Filed Mar. 14, 1960, Ser. No. 14,945
Claims priority, application Germany June 4, 1959
4 Claims. (Cl. 18—30)

The present invention relates to an injection device, particularly to an injection device for use in an injection molding apparatus for thermoplastic material.

It is an object of the present invention to provide an injection device whose outlet orifice is provided with an adjustable closure device, more particularly, with a pressure relief valve-type closure device which can be regulated with a high degree of accuracy, which is reliable in operation, and which is of very simple construction.

With this object in view, the present invention resides mainly in that combination in an injection molding apparatus for thermoplastic material which comprises a heating and plasticizing cylinder having a nozzle orifice, a mounting device fixed to the cylinder and extending laterally therefrom, a nozzle orifice closure device carried by the mounting device for sliding movement relative thereto toward and away from the nozzle orifice, spring means for urging one end of the closure device against the interior end of the nozzle orifice, these spring means being arranged out of the path of heat currents emanating from the heating and plasticizing cylinder, and a micrometer-type screw device in threaded engagement with the mounting device and bearing against the spring means so that the spring force exerted by the latter on the closure device can be regulated by turning the screw device.

As a result, the spring means is not subjected to heat so that its spring characteristics will remain constant for a long period of time. In this way, the spring can be adjusted to any desired position and this will, throughout the life of the apparatus, result in the pre-calculated operating characteristics of the closure device, i.e., the closure device will always yield under the particular pressure for which it is set to yield.

Additional objects and advantages of the present invention will become apparent upon consideration of the following description when taken in conjunction with the accompanying drawings, in which:

FIGURE 1 is a sectional elevational view showing the lower portion of a heating and plasticizing cylinder equipped with an orifice closure device according to the present invention.

FIGURE 2 is an elevational view of a different embodiment of the present invention, shown partly in section and viewed from a position displaced by 90° from that in which FIGURE 1 is viewed.

FIGURE 3 is a perspective view of yet another embodiment of the present invention.

FIGURE 4 is a sectional view taken on line 4—4 of FIGURE 3.

Figures 1, 2:
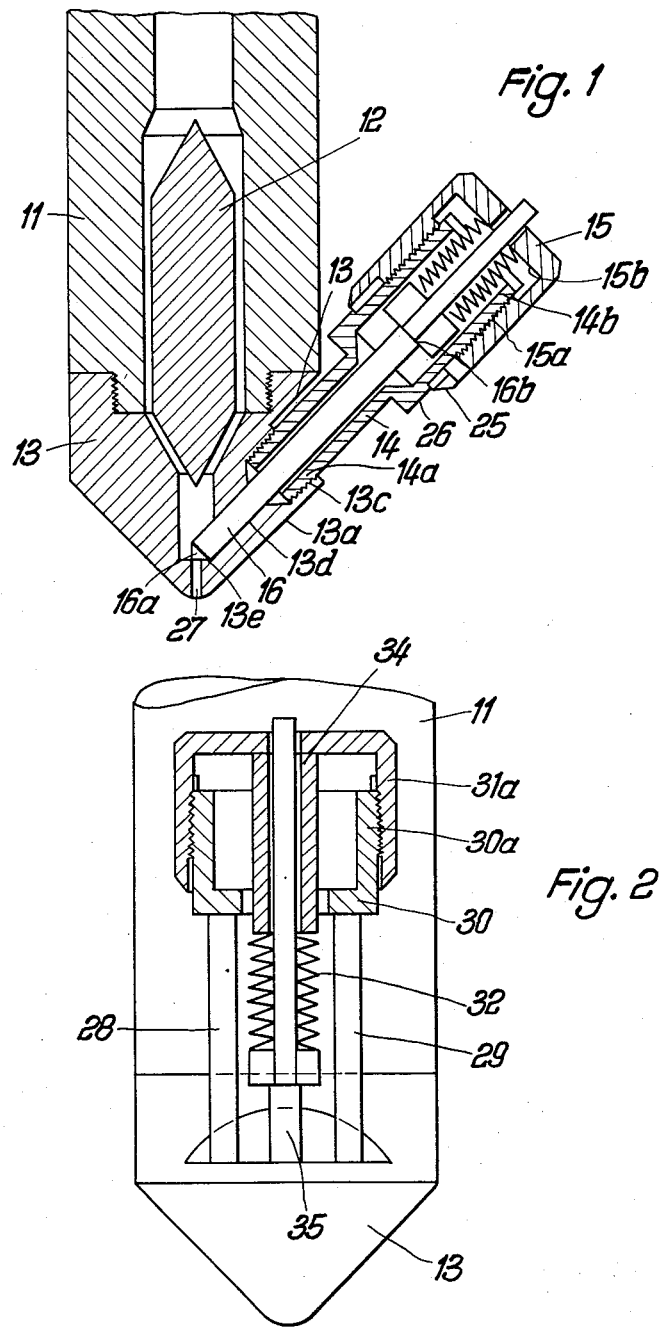

Referring now to the drawings and to FIGURE 1 thereof in particular, there is shown the lower portion of a heating and plasticizng cylinder 11 formed with a conical nozzle portion 13 having a taper 13a and an outlet orifice 27. This cylinder 11 may be carried by the upwardly and downwardly reciprocating press member of a conventional molding apparatus. The cylinder is heated by conventional means and is in communication with an appropriate supply of plastic material to be injected. The molding apparatus as whole, the press member, the heating means and the supply arrangement for feeding the cylinder 11 are not shown as these parts are of conventional construction and form no part of the present invention.

Within the cylinder 11 there is an elongated and generally torpedo-shaped inset 12 which is shrunk in place but allows the flow of plastic material through the cylinder into the nozzle portion. The purpose of this inset is to guide the plastic material radially toward the walls of the cylinder 11 so as to cause a more rapid heating of the material.

The nozzle portion 13a is formed with a cut-out 13b and a bore having an enlarged threaded portion 13c and a smaller smooth portion 13d which is in communication with the interior of the nozzle. A mounting or guide sleeve 14 having an external thread 14a is threaded into the bore portion 13c and extends laterally outwardly from the cylinder. The outer end of the sleeve 14 is enlarged and is formed with another external thread 14b which is in engagement with the internal thread 15a of a cup-shaped screw member 15.

Slidably arranged within the sleeve 14 and the bore portion 13d is an elongated closure control element 16 having a conical end 16a which is adapted to abut the interior end of the orifice 27. That part of the nozzle portion 13 forming the inner edge of the orifice 27 and against which the conical end 16a abuts serves as a valve seat shown at 13c.

The element 16 has an abutment 21 seating against a shoulder 16b, and a spring device 22, shown as a stack of dished springs, is interposed between this abutment and the bottom 15b of the cup-shaped member 15. Thus, the spring force exerted by the spring device on the closure element 16 can be regulated by turning the screw member 15. The screw member 15 thus acts as a micrometer-type screw device, and in order to read its setting, the cup-shaped member 15 may carry a scale 25 which cooperates with an index mark 26 on the sleeve 14.

It will be seen from the above that the closure element 16 serves as a relief valve whose operating point may be adjusted by regulating the screw device which varies the force exerted by the spring device 22. It will likewise be seen that the arrangement of the parts is such that the spring device is arranged out of the immediate heat zone caused by the heating and plasticizing cylinder, including heat currents that rise upwardly therefrom. As a result the spring device will retain the same spring characteristics throughout its lifetime, which would not be the case if the spring device were continuously subjected to the heat emanating from the cylinder.

Furthermore, it will be seen that the parts are so oriented that the direction in which the closure element 16 is slidable forms with the axis of the cylinder 11 an angle equal to the angle of conicity of the taper 13a of the conical nozzle portion 13.

In the embodiment of the present invention shown in FIGURE 2, the mounting device comprises support elements 28, 29 which are threaded into the nozzle portion 13. These support elements carry a hollow carrier body 30 formed with an external thread 30a engaging the internal thread 31a of the cup-shaped micrometer-type screw member 31. Otherwise, the instant embodiment differs from that of FIGURE 1 only in that the spring device incorporates a spacer sleeve 34. This spacer sleeve is shown as engaging the bottom of the cup-shaped member 31 while the stack of springs 32 engages the abutment 33 carried by the closure element 35, but it will be understood that the positions of the stack of springs and the spacer sleeve can be exchanged in which case the springs would be even further away from the heating and plasticizing cylinder 11 and thus further away from the heat radiated thereby.

The embodiment of FIGURES 3 and 4 differs from that of FIGURE 2 in that the support elements 38 and 39, whose bottom ends 38a, 39a are screwed into the nozzle portion 13, carry a support plate 37 which is held in place by nuts 38b, 39b screwed to the threaded upper ends 38c, 39c of the support elements. This support plate has a central threaded bore 37a. The screw device is in the form of a regulating member 36 passing through and in threaded engagement with the bore 37a. One end of the regulating member is in engagement with the stack of springs 40 so that, upon turning of the regulating member 36, the force exerted thereby on the closure element 41 is varied. To allow reading of the setting, support plate 37 carries an index marker 42 which cooperates with a scale 36a arranged at the edge of the head 36b of the regulating member 36.

It will be seen from the above, that the regulating device is of extremely simple construction, while making it possible for very precise settings of the relief valve to be obtained. These settings must often be varied as different thermoplastic materials having different melting and softening points as well as different viscosities are used. Thus, a molding apparatus incorporating the present invention is extremely versatile. For example, the apparatus can be used to mold plastics which are very sensitive to heat so that excessive heat accumulation must be avoided at all costs, lest the material burn. Such heat accumulation cannot be avoided in molding apparatus whose nozzle orifices are non-regulatable.

Furthermore, the present invention allows the injection of plastic materials which in heated state have such low viscosity as to be liquid.

It will be appreciated that, thanks to the above-described arrangements, a very rugged and uncomplicated control device is obtained which is regulatable with a high degree of accuracy. At the same time, the calibration of the device will be accurately retained because the spring device is kept out of the path of heat emanating from the heating and plasticizing cylinder.

It will be understood that the above description of the present invention is susceptible to various modifications, changes and adaptations, and the same are intended to be comprehended within the meaning and range of equivalents of the appended claims.

I claim:
1. In an injection molding apparatus for thermoplastic material, the combination which comprises: a heating and plasticizing injection cylinder having an axially arranged outlet nozzle orifice the interior end of which constitutes a valve seat; an elongated valve-type control element having an operating end abutting directly against said valve seat and extending laterally outwardly from said nozzle to form an acute angle with the axis of said injection cylinder; mounting means attached to said injection cylinder for mounting said control element for movement in the direction of its length, said mounting means likewise extending laterally from said injection cylinder and forming with said axis thereof said acute angle; spring means for urging said control element into direct engagement with said interior end of said orifice, said spring means being located laterally of said nozzle and out of the heat zone caused by said injection cylinder; and adjusting means for controlling the force which said spring means exert on said control element.

2. The combination defined in claim 1 wherein said mounting means comprise a support and a hollow carrier body formed with an external thread and carried by said support, and wherein said adjusting means comprise a micrometer-type screw device in the form of a cup-shaped member having an internal thread engaging said external thread of said carrier body.

3. The combination defined in claim 2 wherein said injection cylinder is arranged so that its axis is substantially vertical, thus locating said spring means to one side of said injection cylinder and out of the path of convection currents rising therefrom.

4. The combination defined in claim 2 wherein said operating end of said control element is conical.

References Cited in the file of this patent
UNITED STATES PATENTS

| | | |
|---|---|---|
| 2,668,325 | Goodwin | Feb. 9, 1954 |
| 2,862,241 | De Mattia | Dec. 2, 1958 |